(12) United States Patent  
Reitzen et al.

(10) Patent No.: US 9,225,694 B1  
(45) Date of Patent: Dec. 29, 2015

(54) MOBILE APPLICATION SECURE DATA EXCHANGE

(75) Inventors: Jared Reitzen, Los Angeles, CA (US); Ojas Amin, Los Angeles, CA (US); Edgardo Ramon, Los Angeles, CA (US); Earl Rossler, Portland, OR (US)

(73) Assignee: MPULSE MOBILE, INC., Encino, CA (US)

( * ) Notice: Subject to any disclaimer, the term of this patent is extended or adjusted under 35 U.S.C. 154(b) by 616 days.

(21) Appl. No.: 13/399,792

(22) Filed: Feb. 17, 2012

Related U.S. Application Data

(60) Provisional application No. 61/446,348, filed on Feb. 24, 2011.

(51) Int. Cl.  
*H04L 29/06* (2006.01)

(52) U.S. Cl.  
CPC .................................. *H04L 63/0464* (2013.01)

(58) Field of Classification Search  
USPC .......................................................... 713/170  
See application file for complete search history.

(56) References Cited

U.S. PATENT DOCUMENTS

| | | | | |
|---|---|---|---|---|
| 5,635,012 A * | 6/1997 | Belluci | .................. | G06K 19/14 156/277 |
| 5,813,009 A * | 9/1998 | Johnson | ............ | G06F 17/30017 707/695 |
| 6,615,244 B1 * | 9/2003 | Singhal | ............... | G06F 17/3089 707/E17.116 |
| 7,627,640 B2 * | 12/2009 | Gardner | .................. | H04L 51/12 709/203 |
| 2003/0130893 A1 * | 7/2003 | Farmer | ............... | G06Q 30/0266 705/14.63 |
| 2003/0191938 A1 * | 10/2003 | Woods et al. | .................. | 713/165 |
| 2005/0014493 A1 * | 1/2005 | Ford | .................... | H04M 1/72547 455/418 |
| 2006/0126850 A1 * | 6/2006 | Dawson | .............. | H04L 63/0428 380/284 |
| 2006/0241982 A1 * | 10/2006 | Seifert | ............... | G06Q 20/3674 705/4 |
| 2007/0283417 A1 * | 12/2007 | Smolen | ............. | G06F 17/30348 726/2 |
| 2009/0265552 A1 * | 10/2009 | Moshir | ............... | H04L 63/0464 713/168 |
| 2009/0288164 A1 * | 11/2009 | Adelstein | ................ | H04L 63/14 726/22 |
| 2010/0333167 A1 * | 12/2010 | Luo | ......................... | H04L 63/20 726/1 |

OTHER PUBLICATIONS

Bønes, Erlend, et al. "Risk analysis of information security in a mobile instant messaging and presence system for healthcare." International journal of medical informatics 76.9 (2007): 677-687.*

* cited by examiner

*Primary Examiner* — Harris C Wang  
(74) *Attorney, Agent, or Firm* — Mintz Levin Cohn Ferris Glovsky and Popeo, P.C.

(57) ABSTRACT

Techniques are described for secure data exchange using a mobile application on a mobile communications device. Such data exchange can be used in a variety of industries including healthcare and finance. Related apparatus, systems, techniques and articles are also described.

17 Claims, 15 Drawing Sheets

FIG. 8

MOBILE APPLICATION SECURE DATA EXCHANGE

RELATED APPLICATION

This application claims the benefit of priority under 35 U.S.C. §119 to U.S. Provisional Patent Application Ser. No. 61/446,348 filed Feb. 24, 2011, the contents of which are hereby fully incorporated by reference.

TECHNICAL FIELD

The subject matter described herein relates to secure data exchange (e.g., messages, etc.) to and from a mobile application on a mobile communications device (e.g., a net-connected mobile device, etc.).

BACKGROUND

Mobile communication devices such as smart phones and tablet computers are increasing in popularity, and are in many instances, replacing traditional laptop and desktop computers. Applications on such mobile communications devices are increasingly utilizing sensitive information. Such sensitive information can range from personal medical information, financial information, as well as confidential enterprise information. Individuals often desire such information to be securely transmitted/stored. In addition, there is an increasingly expansive regulatory environment, which mandates that certain types of sensitive information be maintained as secret.

SUMMARY

In one aspect, a message for delivery to a mobile communications device is generated. Thereafter, the message is encrypted and stored on a remote server. A notification is then provided to the mobile communications device via an unsecure notification modality that indicates the availability of the encrypted message on the remote server and comprising a file location identifier. User-generated input is then received on the mobile communications device from a recipient selecting the file location identifier (or a graphical user interface element associated with same). In response, the mobile communications device retrieves the encrypted message using the file location identifier from the remote server. The message is then decrypted and rendered on the mobile communications device.

The message can be automatically deleted from the mobile communications device when the recipient finishes viewing the message. Automatically deleting can be part of a scrubbing process that repeatedly overwrites the message and deletes the corresponding overwrites.

The message can be generated on a second mobile communications device by a sender. The second mobile communications device can automatically delete the message after it has been stored on the remote server. In some cases, the automatically deleting can also be part of a scrubbing process that repeatedly overwrites the message and deletes the corresponding overwrites.

The second mobile communications device can encrypt the message using a key for the recipient. The key can be stored on the second mobile communications device. The remote server can encrypt the message using a key for the recipient. The message can be retrieved using a secure transmission protocol such as Secure Sockets Layer protocol.

Data used to generate and retrieve the message can pass through a plurality of security zones such as: an outermost security zone providing unsecured data exchange, a first security zone in which application workers validate sender credentials and message format, a second security zone that receives data validated in the first zone, the validated data being archived or sent to the mobile communications device, a third security zone that receives data from the second security zone to be sent to the mobile communications device, such data being encrypted in the third security zone, and a fourth security zone that receives data from the second security zone that is to be archived and data from the third security zone to decrypt, the fourth security zone providing a highest level of security as compared to the other security zones. Data within the fourth security zone that is to be archived can be encrypted with a second encryption key so that the data is doubly encrypted.

The generation, encryption, and decryption of the message can be generated using a software module based on a software development kit. The software development kit can interface with an application to enable secure message exchange.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. Methods can be wholly or partially implemented by one or more data processors within a single computing system or distributed across multiple computing systems.

The subject matter described herein provides many advantages. Chief among those advantages is the ability to securely exchange data to and from a mobile communications device (such as a smart phone or a tablet computer) in order to comply with various regulations (e.g., financial regulations, medical data, etc.).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 8 is a screenshot of a list of potential recipients of a secure message;

DETAILED DESCRIPTION

The current subject matter is directed to a secure message communication method to allow the transmission of text and binary content (such as images, video and sound) to mobile devices, mobile devices to a SaaS infrastructure, as well as mobile-to-mobile communication. The current subject matter can be implemented using a wide variety of web application or mobile operating systems, including, but not limited to, IOS, ANDROID, BLACKBERRY, SYMBIAN, WINDOWS. While the current disclosure is directed to applications in the healthcare, retail, government and financial industries, it will be appreciated that the current subject matter is applicable to any situations in which there may be a need to exchange secure messages using mobile devices.

A software development kit (SDK) can be provided in order to enable application developers to develop applications including mechanism to securely receive and/or transmit messages and content in an application.

Message Management.

Figure 1:
FIG. 1 is an image of a mobile communications device having a resident application allowing a user to download secure messages.

The SDK can give application developers a way to create an inbox within any mobile application. The inbox's design can be customized including the layout, color, size and icon. The inbox will allow users to send and receive secure messages (see, for reference, FIG. 1 which shows a sample application in which secure messages can be received and/or transmitted). The SDK can also provide that messages (sometimes referred to herein a "AppMails") can be displayed and viewed within the inbox in a manner similar to how e-mails are viewed in an email program such as Microsoft OUTLOOK. Messages can include text, rich text, HTML, or binary content. Any message whether text, rich text, HTML or binary content can be stored locally within the application, or served up securely over the mobile device's internet connection.

Security.

Using the SDK, developers can ensure any communication coming into the end-user's inbox is secure. Likewise any message sent from the user back to a SaaS infrastructure (e.g., mobileStorm SaaS infrastructure, etc.) or another device can be encrypted. By default, messages can be set to "secure mode" as a fail-safe scenario. In addition, the SDK can also allow the decryption of the message within the app. Likewise, when an end user responds to the message, or forwards it to another device, the message can be encrypted and delivered back to the SaaS infrastructure (which can be cloud-based). Users can reply back with simple text, video, images and sound. In some implementations, the underlying video or sound files are not encrypted—but rather, an encrypted message includes a link to a hosted site such as YOUTUBE or SOUNDCLOUD.

Healthcare Use Case Example.

Any business dealing with healthcare related data needs to adhere to HIPAA regulations. Violations of HIPAA can be very costly. Security is a very important part of HIPAA. Under the Hi-Tech act (a section within HIPAA) Specifically Protected Health Information (PHI) cannot be transmitted if the transmission of the data is unsecure. However being able to transmit PHI is a very big business opportunity. For instance, a member of a healthcare provider might want to receive a text message (SMS) reminder to take my medicine. If the brand name of the medicine is included in the text message, the text message would be in violation of HIPAA because the name of the medicine could identify the member's condition. Conditions are considered PHI, and SMS (the transmission method) is an unsecure message protocol. With smart phones, secure messages can be sent to members, or data can be received from an application in a secure way. Mobile applications can have the ability to secure data, plus the applications can be configured to require the member to log into an application with a user name and password.

Healthcare Industry.

There are many scenarios in which there may be a need for secure transmission of data. First, a single source may need to send data to many recipients (e.g., a healthcare provider to its patients). Such information could relate to disease management such as a healthcare provider communicating an important message from the FDA about a particular drug someone might be taking that has been recalled. In another example, real-time health data (e.g., biometric feedback data, glucose monitor readings, etc.) can be collected by a mobile phone and transmitted to a remote resource for logging, characterizing, and the like. Advances in phones and hardware coupled to phones allow for the collection of data such as heart rate so that such data can be sent in real-time securely back to remote servers. Another healthcare scenario relates to communications between patients and caregivers (e.g., doctors/nurse). For example, a patient takes a picture of a rash, sends it securely to a SaaS infrastructure that delivers it to an electronic medical record (EMR) system that the doctor or clinic is using. The doctor views a picture of the rash within the patient's record, diagnoses the patient, and sends a message back to the patient securely into the patient's inbox.

Retail Industry.

Secure data exchange can also play a role in retail environments. For example, remote secure mobile communications can allow a merchant to conduct business with little infrastructure while retaining a high level of security, as required by PCI-DSS v2. A developer can leverage the secure message SDK to allow the protection of point of sale (POS) transactions for payment card present (i.e., the card is physically present) and payment card not present processing for either real-time or batch processing modes. By using the secure messaging SDK merchants can retain PCI-DSS compliance because data transmission can be fully encrypted not only at the message level but also at the network level so that dual forms of security are always taking place. In addition, merchants can protect their client's anonymity and or confidential data by using secure messaging to communicate back and forth to their client base at a one-to-one or one-to-many scenario.

Financial Industry.

The current subject matter enables an ability to communicate to mobile devices, which are in the field that have limited mobile network connectivity that do not have permanent network addresses. By using the SDK a financial institution can continue to adhere to PCI-DSS standards because data is transmitted securely.

Government.

For government applications, the current subject matter enables the ability to leverage ad-hoc non-secure networks due to lack of reliable and or planned infrastructure to transmit messages securely via mobile devices while utilizing scarce networking resources (e.g., FEMA, etc.). When entering an arena with limited bandwidth and or the ability to reliable authenticate an individual. Secure messages containing data from the field can be transported to a central location where further analysis can be conducted to determine the next course of action to be taken.

Secure Message Workflow.

Figure 2:
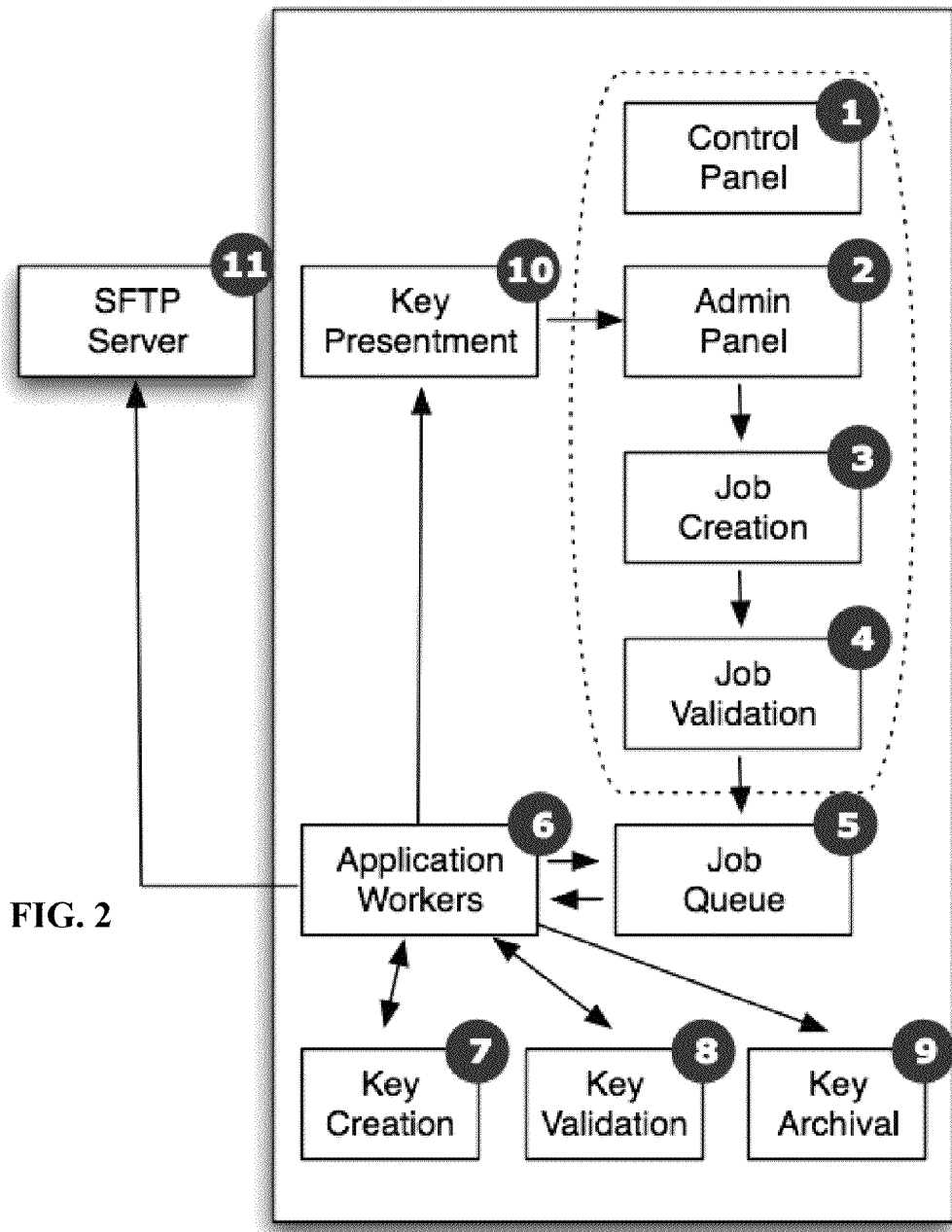
FIG. 2 is a diagram illustrating a secure message workflow.

The following discusses technical processes for how businesses and individuals can send secure messages from a SaaS based infrastructure (sometimes referred to herein as a "control panel"), APIs (application programmable interface) and from a mobile device. Reference can be made to the diagram of FIG. 2.

1. Security
  a. Key Generation
    i. Overview of key generation
    ii. Requirements
    iii. Steps & Process
    iv. Workflow Diagram
  b. Messaging
    i. Overview of secure message transition
    ii. Requirements
    iii. Steps & Process
    iv. Workflow Diagram
2. Methods to Send Secure Messages
  a. Using APIs
    i. Overview: How someone would use our APIs to send one-to-many or one-to-one secure messages.
    ii. Requirements
    iii. Steps & Process
    iv. Workflow Diagram
  b. Using SaaS Infrastructure (Control Panel)
    i. Overview: How someone would use our Control Panel to send one-to-many or one-to-one secure messages.
    ii. Requirements
    iii. Steps & Process
    iv. Workflow Diagram
  c. Using Device-to-Device
    i. Overview: How someone would use their mobile device to send one-to-many or one-to-one secure messages.
    ii. Requirements
    iii. Steps & Process
    iv. Workflow Diagram Security, Key Generation: Overview of Key Generation Process.

In some implementations, each client can have a unique encryption key. It will be appreciated that a variety of encryption key techniques can be utilized and that the following is provided as one of many such techniques. After the key creation process is complete the SaaS infrastructure can test, review and affirm a secure encryption tool.

The encryption key can, in some implementations, be a minimum of 256-Bit with a recommended key strength size of 2048-bit. The key expiration can be set to five (5) years. Pass phrases associated with the key can have twelve alphanumeric characters or greater. An individual client requesting a key can have an authority level at the corresponding organization of a certain level (with regard to data security) such as Data Security Officer, Compliance officer, Director or higher. A public key can be embedded into the utilized mobile communications device via the SDK so that end-users can have a seamless experience.

The following can allow a client to utilize a web browser to initiate and authenticate and begin the key generation process. Via the control panel, a client can log in by entering a username and password. Thereafter, the client can navigate to a key creation section and enter required information. When a pass phrase is requested a 12 alphanumeric character phrase can be used to ensure strong passwords are utilized. Upon key creation, private and public keys are immediately moved from a volatile location (i.e. RAM, etc.) to a non-volatile (e.g., Hard Drive, etc.) storage area were keys are then encrypted and stored with a SaaS infrastructure key for archival.

The following provides a process by which a SaaS infrastructure authorized resource can take to grant and ensure defined policies and procedures are kept. Data providing a notification of the creation of the key can be passed to an administration panel for manual validation of key. The validation process can comprise: validating user requesting a key had a valid login; validating login source information (i.e., source IP address and username, etc.), validating client employee validation through a publicly available mechanism to access client (e.g., client's human resource department telephone number that is publically listed (i.e.: DUNS, yellow pages, white pages) (validation of resource legal name, title and if they are currently on vacation must be obtained and documented), and/or contacting client through publically obtainable telephone number utilizing company IVR telephone directory (if not found, contact company operator and ask for the human resources department and have them transfer to the client agent requesting key creation). Upon a complete and positive outcome the workflow can continue. If a negative outcome is encountered, other measures can be taken to ensure a valid security check can be conducted.

Job Creation.

Upon a successful security check being conducted and submitted for automated workflow processing, a snapshot of validated client data can be taken along with approving resource full name, date and time. With these data points a MD5 checksum can be created to ensure data is not tampered.

Job Validation.

Once the job is submitted, additional validation checks can be conducted to ensure data does not contain arbitrary data. (i.e.: noname@somedomain.com, 555-555-1212). Upon successful completion of automated tests, data points can be supplied that have their MD5 checksum validated and client pass phrase merged. Upon a successful merger a new MD5 checksum can be created and the request for key generation will be submitted for processing Job Queue.

When a key creation request is placed into the job queue it can be immediately placed in a secure and non-persistent and volatile system area.

Application Worker.

The role of this area can be to act as a traffic director thereby starting, pausing and stopping the data workflow.

Key Creation Worker (KCW):

The objective of this worker can be to seek any new key creation requests. Upon detection of a key request, the KCW can validate the job queue's MD5 checksum and create the physical key within a non-persistent storage area. After a successful key generation, a simple non-transmittable message can be encrypted and deciphered to ensure the keys validity. Once the key has created a successful encrypted message which has been decrypted the client key can be copied to a SFTP server for client retrieval. Retrieval can be conducted within seven (7) consecutive days until the platform will automatically delete the key in question.

Key Presentment:

After the key creation worker has completed its tasks, company database entries can then be updated with key creation data points (as described above).

Messaging: Overview of Secure Message Transition Process.

Figure 3:
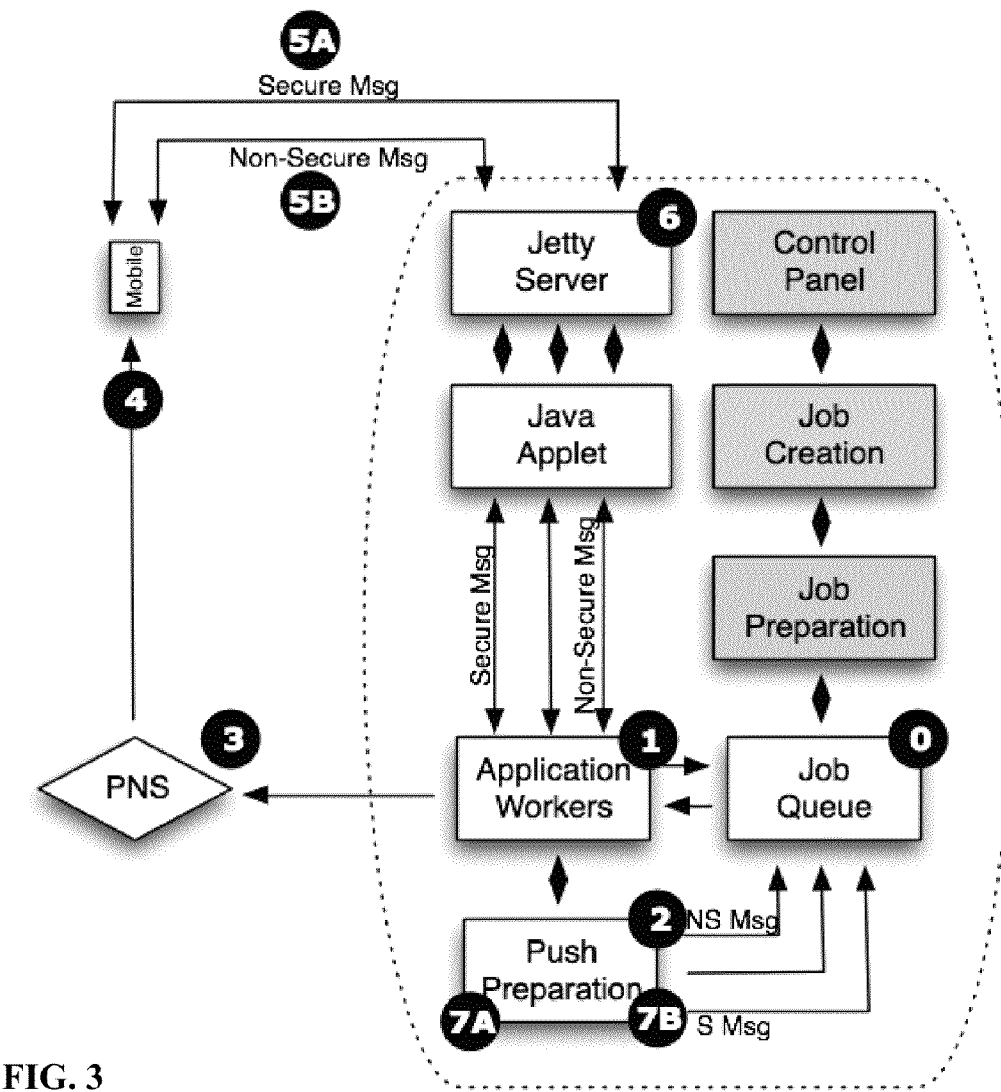
FIG. 3 is a diagram illustrating a secure message transition process.

FIG. 3 and the proceeding section details an actual transmission process from and to a device. During transmission all secure communications can encapsulate dual levels of security to ensure the strongest level of security available commercially. The requirements can include: licensed and Registered secure message SDK, valid encryption key created through SaaS infrastructure Asymmetric Key Creation, a fully tested and accepted mobile application, and an account configured to send secure messages and is in good standing.

Again referring to FIG. 3, the workflow assumes that there is at least one message within the job queue.

Summary of Application Workers:

The role of this area can be to act as a traffic director thereby starting, pausing and stopping the data workflow. Message Waiting Worker (MWW): The role of this application can be to detect new messages waiting for a subscriber and flagged to signal for a push notification is needed. Secure Message Retrieval Worker (SMRW): The purpose of this application can be to broadcast messages securely to the intended handset. Message Retrieval Worker (MRW): The purpose of this application can be to broadcast non-secure messages to the intended handset.

Application Workers:

Push Notification Worker (PNW): Upon notification from the MWW the PNW will send a secure external notification out to a third party provider. This notification can then in turn notify the push notification service.

Push Notification Service (PNS):

This service can act as a conduit to complete the message transmission process.

Figure 4:
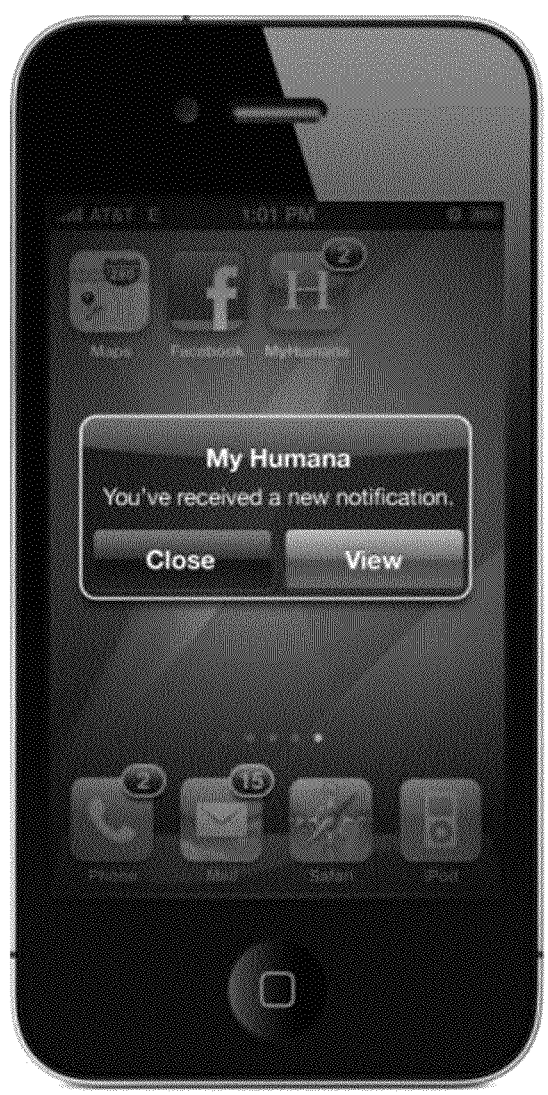
FIG. 4 is an image of a mobile communications device showing a notification message.
Figure 5:
FIG. 5 is an image of a mobile communications device showing an inbox with messages that were securely downloaded.

Notification Message:

When a notification is sent out via the Push Notification service, the notification can appear to the end user allowing to end user to click "view" to retrieve their message. See, for example, FIG. 4 (and FIG. 5 shows an inbox with downloaded messages).

Message Transmission:

When a user goes to view a message they can call either a secure (5A) or unsecure message (5B).

Secure Message Transmission.

Upon successful notification from step four (4) (FIG. 3), the user can be directed to their application inbox which will show new message(s) waiting. When a user selects a secure message a Secure Socket Layer (SSL) connection can be made back to the API gateway requesting the secure message via a unique identification hash sequence. Once the request has been made, a fully encrypted or armored message can be transmitted over SSL connection. During this transmission there will be dual layers of security, first at the TCP/IP level with SSL connections being used. Thereafter a secondary level of protection can be used to protect the actual message payload itself. Once a positive transmission has been received the original message will be scrubbed within the hour. (Next Step 6A).

Non-Secure Message Transmission.

Upon successful notification from step (4) the user can be directed to their application inbox which will show new messages waiting. When a user selects a non-secure message a clear-text string request can be made that will request a specific message via unique identification hash sequence. Once the request is validated the desired message can be sent over standard TCP/IP protocols with no added protection. (Next Step 6B).

Message Viewing.

A user may log into any device or web application, which contains the secure inbox using a valid username and password combination. For example, within a family, one spouse may be able to use the other spouse's mobile communications to device to view his or her messages (so long as the username/password combination is authenticated). The following describes how both secure and non-secure messages can be viewed on a device.

Decryption of a Secure Message.

Once the application has received a completed transmission return code a few steps can be taken. When the application requests to decrypt the message it can utilize the embedded public key and attempt the decryption process. If the message is not successful, it can return a negative return code alerting the user to try to retrieve the message once more. Per step 5A the user can have, for example, one hour to retry the message before it is automatically removed and scrubbed from the platform. If the message is successful and is decrypted correctly it will then be displayed to the user while not using any persistent storage to display the secure message in question. (Next Step 7A).

Non-Secure Message.

When a non-secure message is received it will be simply displayed to the end-user. (Next Step 7B).

Message Removal.

The following describes the process the platform can take to remove secure and non-secure messages from a device.

Secure Message Deletion & Scrub.

Once the user exits from reading, the message can automatically delete the encrypted/armored message and scrub the decrypted message. The scrubbing process goal is to obliterate any remnants of the decrypted message by conducting multiple deletes and writes to the area were the message content was placed. (Next Step 8).

Non-Secure Message Deletion.

Upon request from the end user of the device a non-secure message will be simply deleted from persistent storage. (Next Step 8).

Device Message Status.

Upon successful device arrival, reading, message deletion and scrub these metrics can be passed back to the originating platform so that message confirmation and trends can be delivered to sender.

Methods to Send Secure Message.

Figure 6:
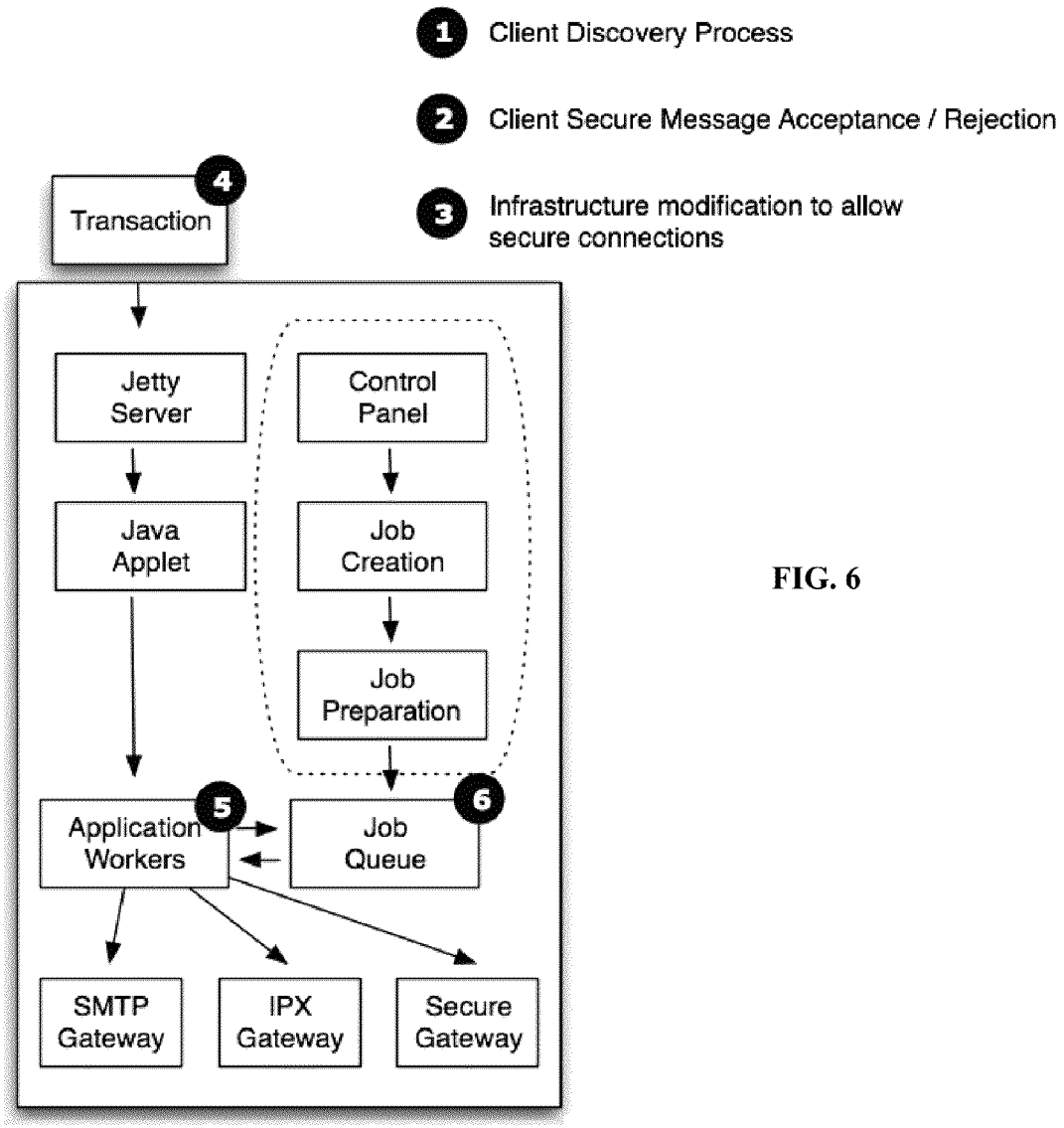
FIG. 6 is a diagram illustrating secure message transmission.

The following describes how secure messages can be transmitted into a message queue using APIs. Reference is made to FIG. 6. The following illustrates the process by which a third party can create a secure method of communication to the SaaS infrastructure. Thereafter, the interacting party (e.g., health service provider, etc.) can start, pause, and stop secure communication with the SaaS infrastructure. The requirements can comprise: a licensed and registered secure message SDK, a valid encryption key created through a SaaS infrastructure Asymmetric Key Creation, a fully tested and accepted mobile application, and an account configured to send secure messages and is in good standing.

The following process details how a client can populate a message queue via a previous defined and tested statically mapped IP address.

Discovery.

Discovery can be used to ensure proper configuration and fact finding to maintain a secure production environment. A client can request and fills out a form for Secure API Message Queue Access. Information that can be requested here, includes, for example: primary Static IP address and subnet where requests will be deriving from, secondary Static IP address and subnet where requests will be deriving from, defined port number, firewall model and fail-over process, primary technical contact with direct and mobile telephone numbers, secondary technical contact with direct and mobile telephone numbers, and/or 365×24×7 NOC support telephone number where requests will be originating from, self-assessment security report, and/or requested first date of service.

Acceptance or Rejection for Secure Messaging Service.

A completed security packet can be reviewed to assess client risks based on volunteered data. Additional follow up questions may be required to satisfy an internal assessment of client infrastructure (i.e., a subjective assessment by a human operator, etc.).

Infrastructure Configuration.

Upon acceptance in the SaaS infrastructure secure messaging platform, certain functionality can be setup with the client including, for example: static IP address mappings, a logical secure connection (i.e.: SSL, VPN over SSL), opening up and or requesting the needed firewall ports and routes on clients firewall, and/or transferring of test messages sending and receiving within a sandbox environment.

Message Transmission.

When the client has a message to send to a one-to-one or one-to-many scenario the text file (CSV, XML, tab delimited) that is transmitted can allow for field mapping so that it can be parsed and correctly and validated.

Creating an Encrypted Message (Full or Armored).

Upon successful validation of a message from client the message can be encrypted/armored using clients private key. Upon successful encryption/armor completion the message can be set in a secure message queue with no persistence.

Using SaaS Infrastructure (Control Panel): Overview of Transmitting Secure Message into Message Queue.

Figure 7:
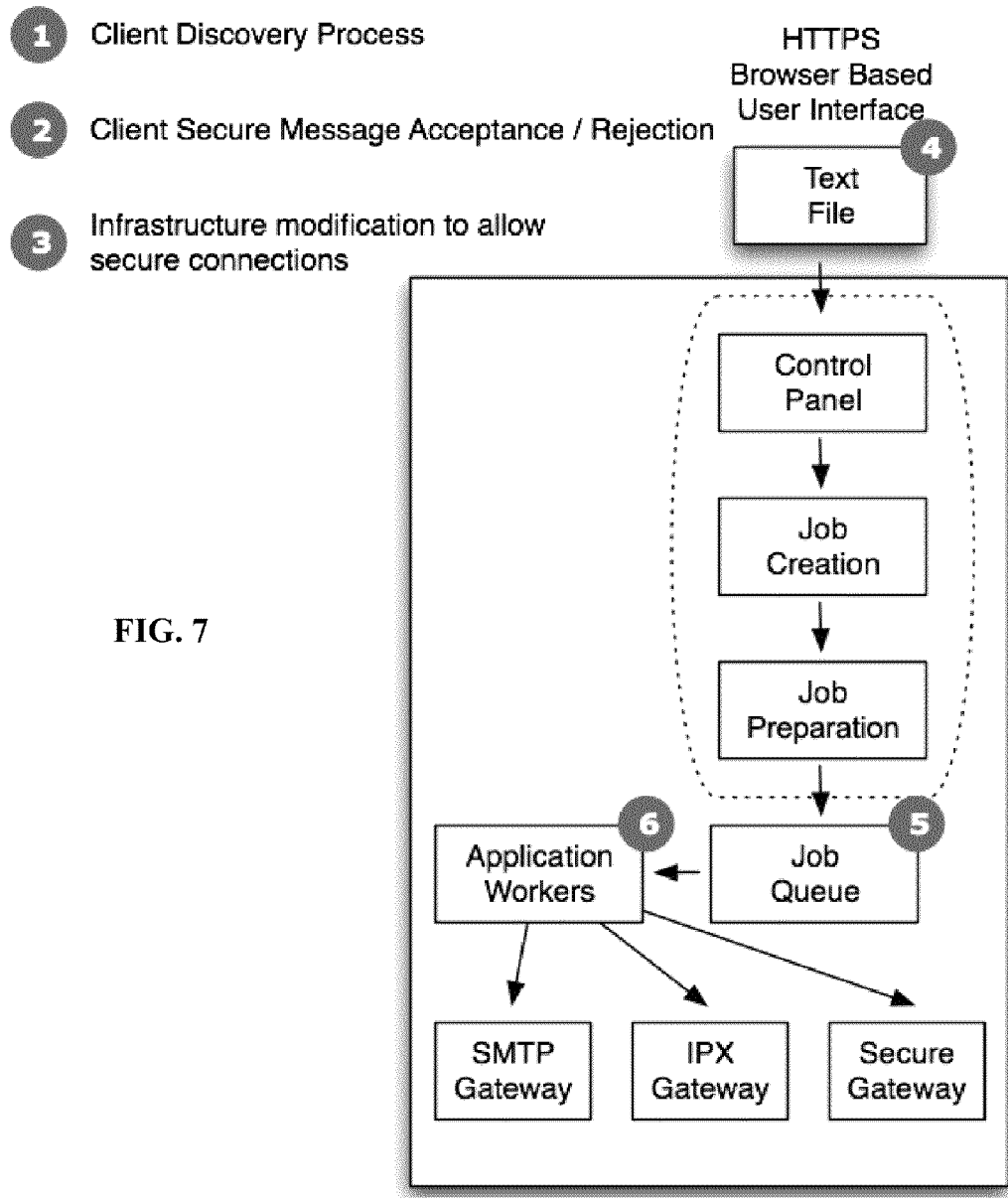
FIG. 7 is a diagram illustrating transmission of a secure message into a message queue.

The following is in reference is made to the diagram of FIG. 7. The procedural steps below address how a client can manually place data into a SaaS application. The requirements can include: licensed and registered secure message SDK, a valid encryption key created through SaaS infrastructure Asymmetric Key Creation, a fully tested and accepted mobile application, and an account configured to send secure messages and is in good standing.

A client can populate a message queue via a previous defined and tested statically mapped IP address. The following allows for proper configuration and fact finding to maintain a secure production environment. A client can request and fill out a request for Secure Control Panel access for Message Queue Access. Information that can be requested here includes, for example: primary static IP address and subnet where requests will be deriving from, secondary static IP address and subnet where requests will be deriving from, primary technical contact with direct and mobile telephone numbers, secondary technical contact with direct and mobile telephone numbers, self-assessment security report, and or requested first date of service.

Acceptance or Rejection for Secure Messaging Service.

A completed security packet that includes the above-referenced volunteered data can be used to assess a client's risks. Additional follow up questions may be required to satisfy an internal assessment of client infrastructure.

Infrastructure Configuration.

Upon acceptance in the secure messaging platform, the client can set up the following: static IP address mapping, a logical secure connection (i.e.: SSL), opening up and or requesting the needed firewall ports and routes on clients firewall, and/or transferring of test messages sending and receiving within a sandbox environment.

Control Panel.

Figure 8:
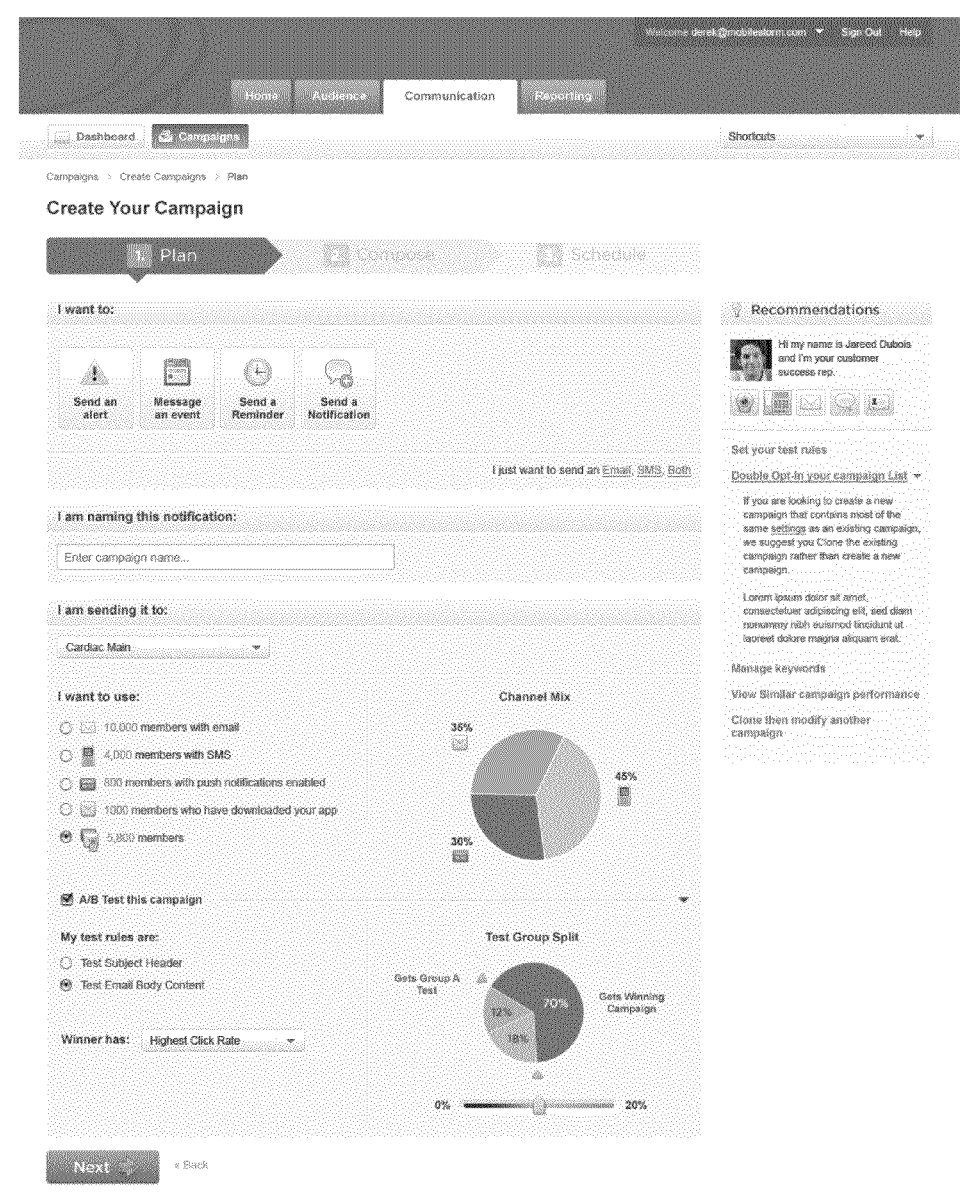
Figure 9:
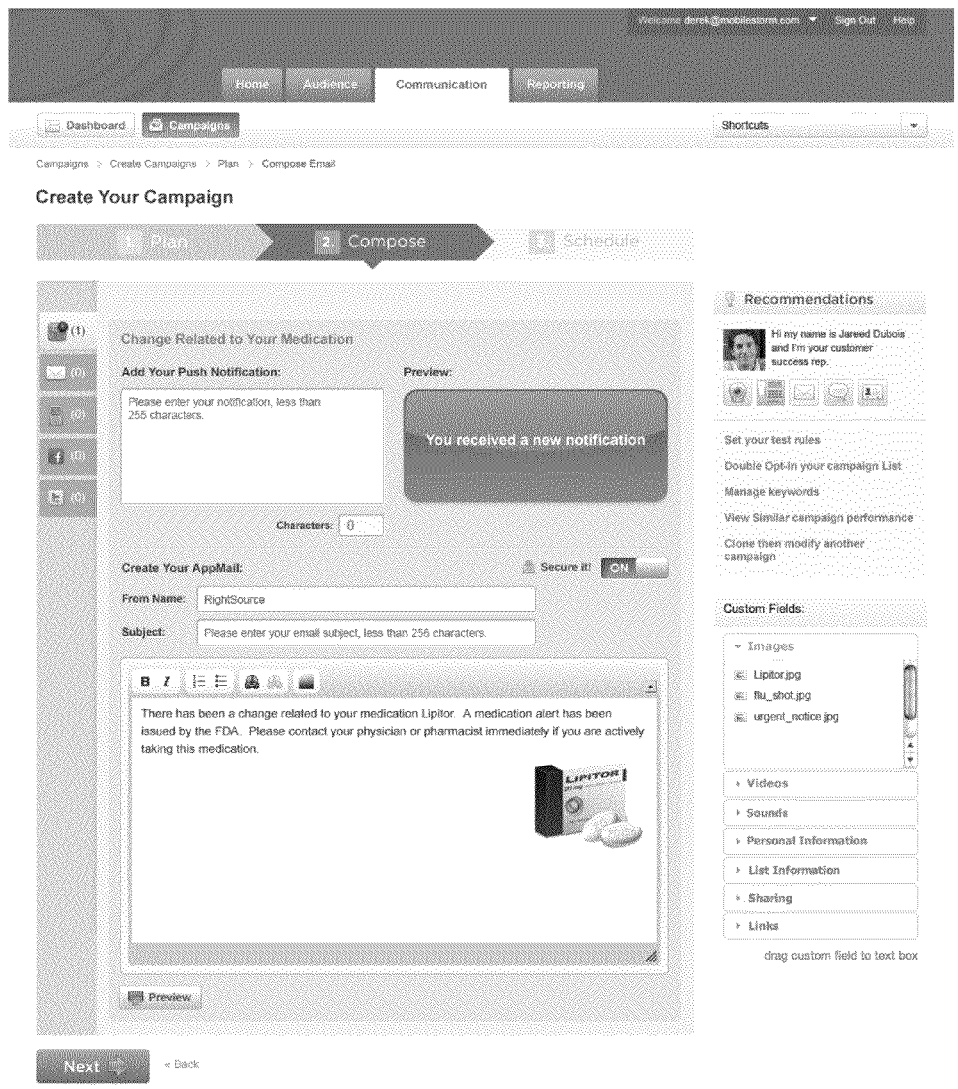
FIG. 9 is a screenshot of an application composing a push notification.
Figure 10:
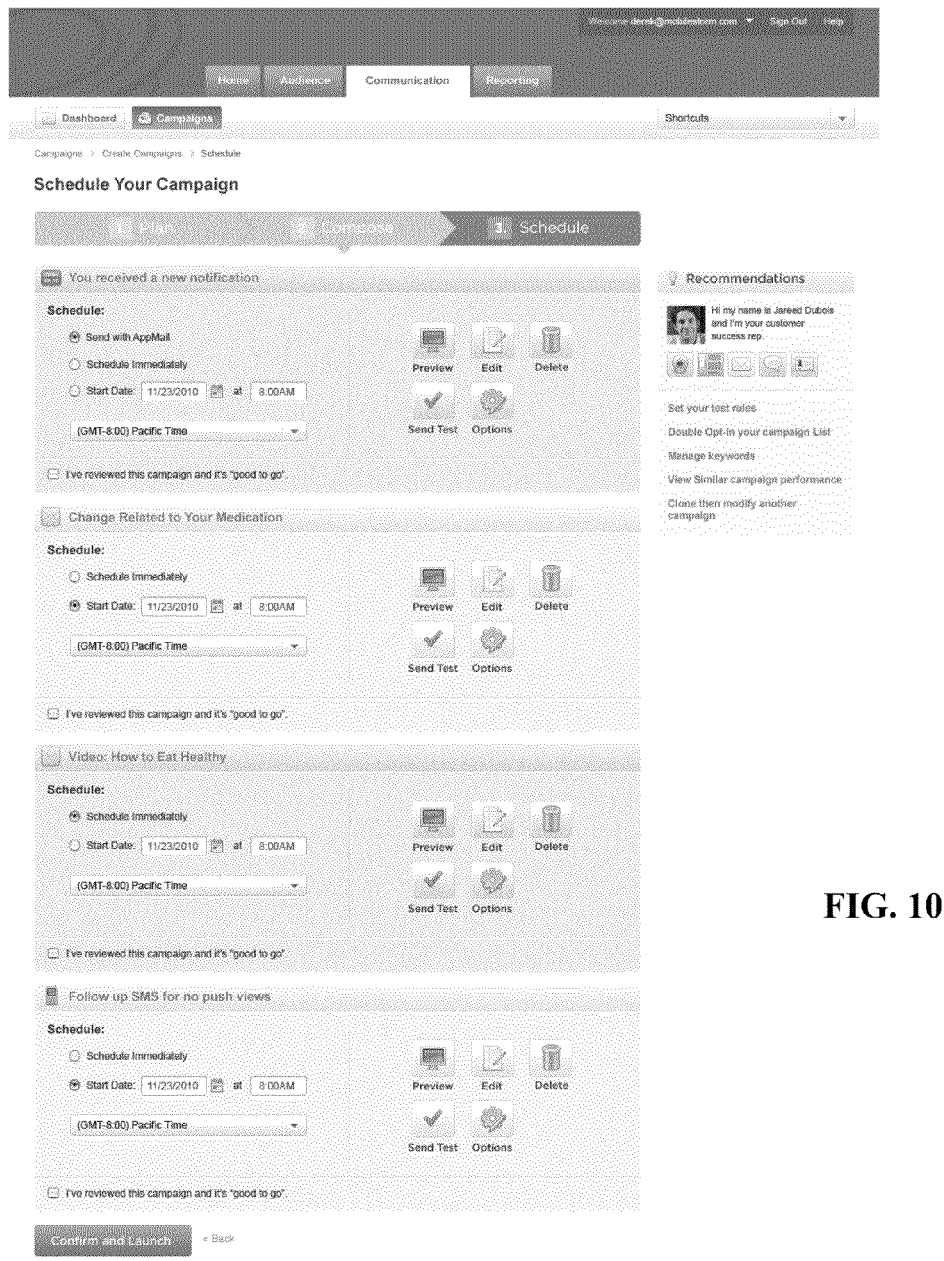
FIG. 10 is a screenshot of an application scheduling push notifications.

The control panel can allow a client to decide who should receive their message, create both a push and AppMail and schedule these message to go out at specific times. A client must first decide on their goal (e.g., I want to send out a notification to my audience). They must then select the list they want to target (see screen shot of FIG. 8). The list could be comprised of members who have a heart condition. A client can then decide how they would like to reach those members such as "I want to send a push notification and/or send an AppMail". After selecting the modes of communication a client can compose their push notification and AppMail (see screen shot of FIG. 9). Finally a client can schedule their messages to go out at specific dates and times (see screen shot of FIG. 10).

Message Transmission.

When the client has a message to send to a one-to-one or one-to-many scenario, the text file (CSV, XML, tab delimited) can be uploaded and have fields that can be mapped so that it can be parsed and correctly validated.

Creating an Encrypted Message (Full or Armored).

Upon successful validation of a message from client the message can be encrypted/armored using the client's private key. Upon successful encryption/armor completion the message can be set in a secure message queue with no persistence.

Figure 11:
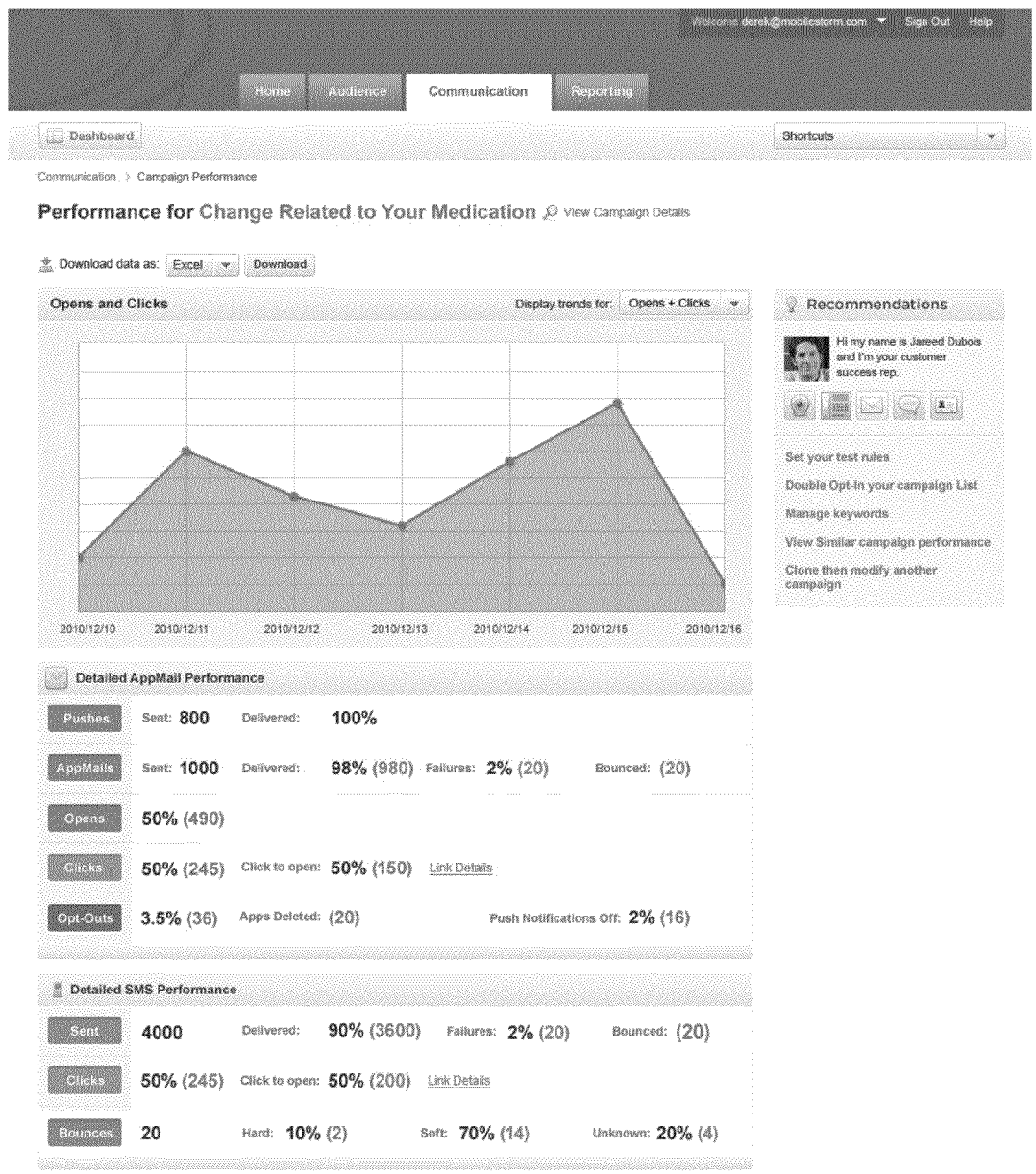
FIG. 11 is a screenshot of an application showing how long a message was viewed.

The control panel can also be used to view reports on how a particular communication performed. After a push notification and the corresponding message has been delivered, a client can run a performance report via the control panel to see the effectiveness of how their communication with their members preformed. They can view everything from who opened their message, clicked on links, deleted the app and/or turned off push notifications (e.g., opt out data) as well as how long a message was viewed (see screen shot of FIG. 11).

Using Device-to-Device: Overview of Transmitting Secure Messages Mobile-to-Mobile.

Figure 12:
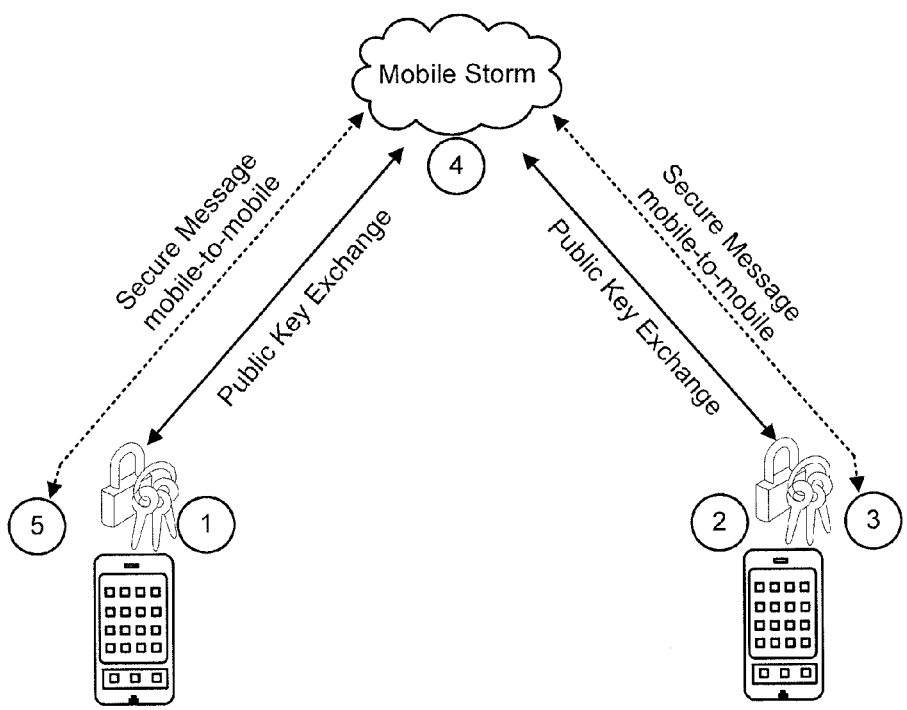
FIG. 12 is a diagram illustrating transmission of secure messages between two mobile communications devices.
Figure 13:
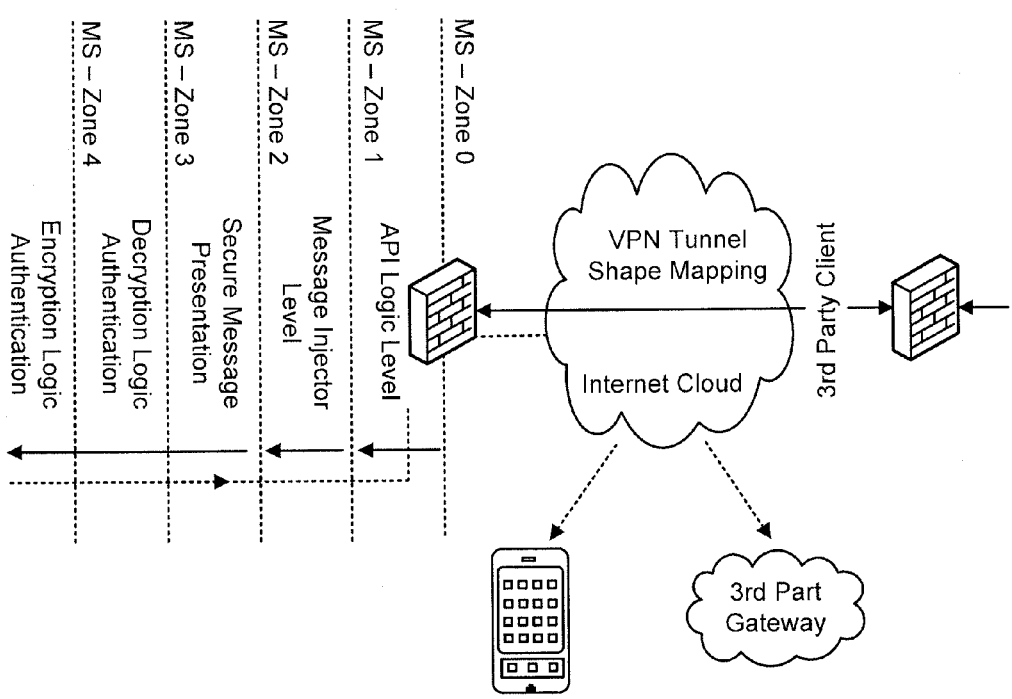
FIG. 13 is a diagram illustrating various data messaging layers.
Figure 14:
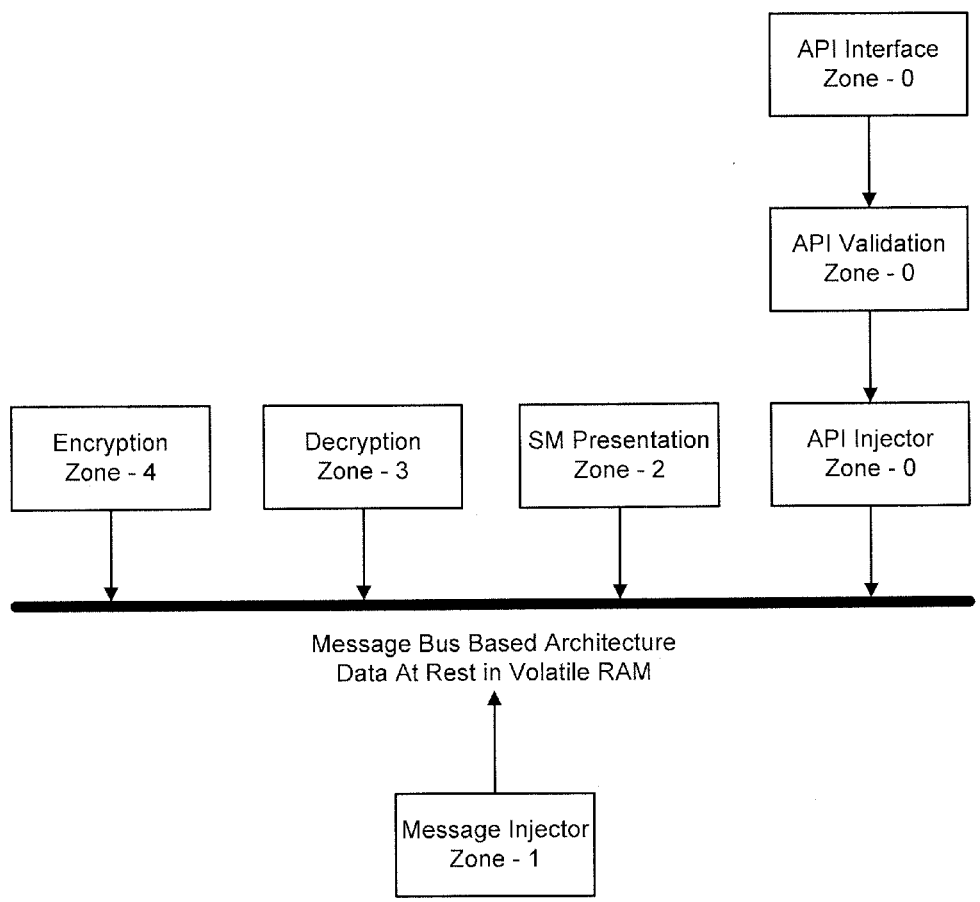
FIG. 14 is a diagram illustrating a bus-based messaging architecture.

The following description defines the processes that can allow a mobile device to send to another mobile device for secure messaging (and is with reference to FIG. 12-14). Requirements can include, for example: licensed and registered secure message SDK, a valid encryption key created through SaaS infrastructure Asymmetric Key Creation, the exchange of Public key of parties receiving message, and/or a sponsoring account configured to send secure messages that is in good standing (in some cases mobile-to-mobile can be dependent on sponsoring service provider).

The following is a scenario on how secure data (e.g., messages, etc.) can be sent from one mobile communications device to another. An end user first sends its public key to recipient via the SaaS infrastructure gateway. Once the SaaS infrastructure receives the public key, it can push the new key to the other mobile communications device. End users are then able to send and receive secure messages via the SaaS infrastructure gateway. End users can then compose secure messages on their respective mobile communications devices and then such messages can be secured on such device (when it is stored) using an embedded key. Messages can be subsequently uploaded to SaaS infrastructure gateway and push notification can be sent to the recipient mobile communications device. The user can then open their inbox, and download the secure message. The decryption process can continue as normal because the other mobile communications device (e.g., external phone source, etc.) public key pair will be next in the key chain set. Thereafter, end users can securely exchange data via the SaaS infrastructure.

FIGS. 13-14 are diagrams illustrating network layers as well as compliance issues. In particular, the figures illustrate a physical and logical network infrastructure which can play an integral role to the protection of data being transmitted in, through and out of the SaaS infrastructure.

Overview Network Layers:

Noted below are pathways that data can follow to adhere to both HIPAA and PCI-DSS Level 1 (as of the date of this filing). As HIPAA and PCI requirements evolve, the backend infrastructure can be modified to keep in pace and surpass compliance requirements. This process details how data can be received, managed and distributed through five network security zones to ensure data, encryption security and creation of a separation of duties.

Summary:

The following step illustrates how data will be accepted from the outermost zone known as zone-O. As discussed above with regard to secure message transmissions during the client discovery process. One of the steps provides that a primary and secondary origin address can be defined. By using these addresses one can establish a reliable, repeatable and always on connection which creates a encrypted, secure and private 1-to-1 relationship between clients and the SaaS infrastructure.

Within zone-1 as the data now enters into the SaaS infrastructure via the API or Control Panel various Application workers can start to validate sender's credentials and message format. Should invalid data be encountered, such data will be immediately dropped and scrubbed out of the system.

As the data is now validated from zone-1 and passed into zone-2. The data can sit on a dedicated message bus waiting for additional application workers to take effect. It is at this point data can be either a) archived for later use or b) be immediately be sent out to a participating electronic device as defined above with regard to transmission of secure messages.

Should data be marked for archival or for immediate transmission it can be shuttled into zone-4 which is the highest level of security. Within zone-4 additional Application workers can activate and immediately encrypt messages with the appropriate client key for immediate transmission. Otherwise, the data will receive a double encryption first by the appropriate client key then a secondary encryption with the SaaS infrastructure key set. By taking these actions the SaaS infrastructure ensure that when data is at rest it is fully encrypted.

In the event a third party transmits an encrypted message to the SaaS infrastructure, the message lifecycle would follow similar steps however the decryption process can only take place within zone-3.

Figure 15:
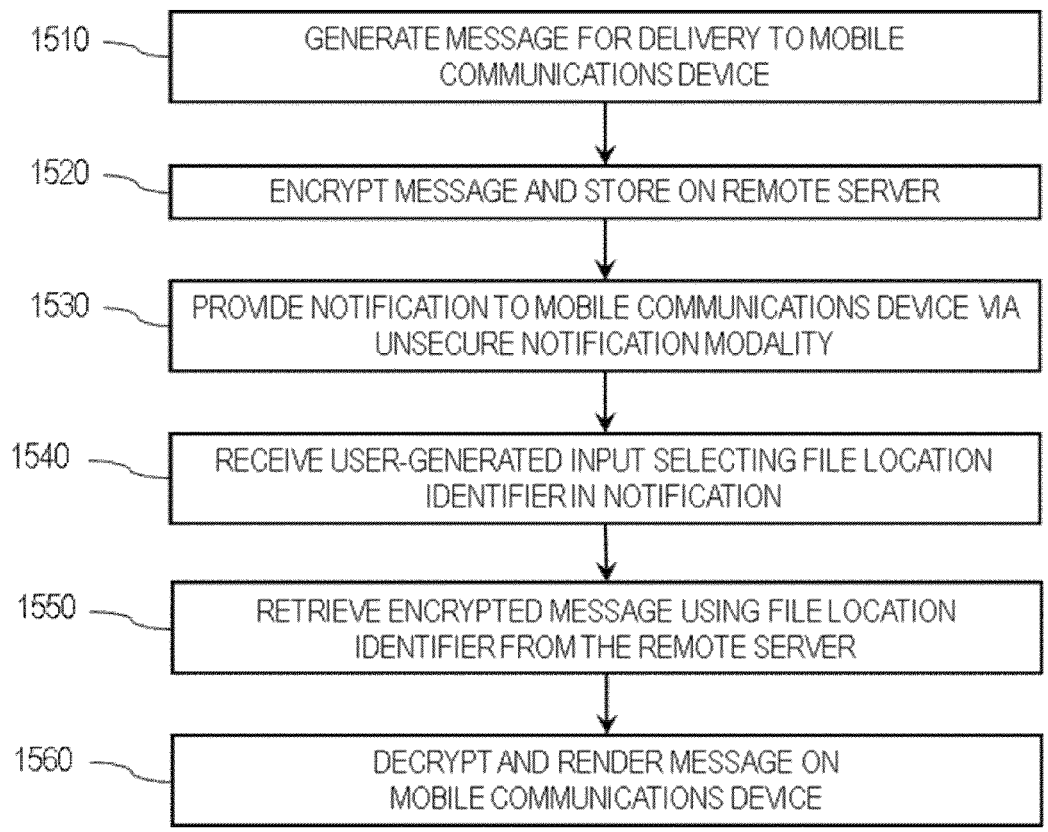
FIG. 15 is a process flow diagram illustrating generation and delivery of a secure message along with a corresponding push notification.

FIG. 15 is a process flow diagram illustrating a method 1500 in which, at 1510, a message for delivery to a mobile communications device is generated. Thereafter, at 1520, the message is encrypted and stored on a remote server. A notification is then provided, at 1530, to the mobile communications device via an unsecure notification modality that indicates the availability of the encrypted message on the remote server and comprising a file location identifier. User-generated input is received, at 1540, on the mobile communications device from a recipient selecting the file location identifier (or a graphical user interface element associated with same). In response, at 1550, the mobile communications device retrieves the encrypted message using the file location identifier from the remote server. The message is then decrypted and rendered, at 1560, on the mobile communications device.

The above describes an arrangement where the service is set up and approved manually, however alternative implementations can include self-service features. A client can come to the website and be able to sign up for our service using a credit card. Once they were successfully charged, they would gain access to their SaaS control panel. At this point, they can implement the SDK or use a web services API to create a secure inbox within their mobile app or website. In some cases, support can be provided for a number of mobile app and mobile site platforms to easily create and launch a mobile app or site that already supports the secure inbox. Whether the client creates a mobile app/site with a partner or creates it themselves, there can be a section within the control panel where they can input their mobile app information. This way the system can automatically know which app or site to route the secure message to. Clients can be able to upload membership data such a token/device ID so they could target their subscribers with secure messages and push notifications.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method comprising:
generating a message for delivery to a mobile communications device; encrypting the message and storing the message on a remote server by passing the message through a plurality of security zones that facilitate the performance of separate duties;
providing a notification to the mobile communications device via an unsecure notification modality, the notification indicating the availability of the encrypted message on the remote server and comprising a file location identifier;
receiving user-generated input on the mobile communications device from a recipient selecting the file location identifier; retrieving, by the mobile communications device, the encrypted message using a file location identifier from the remote server;
and decrypting and rendering the message on the mobile communications device; wherein the message is generated on a second mobile communications device by a sender, the second mobile communications device automatically deleting the message after it has been passed through the plurality of security zones and stored on the remote server;
wherein the security zones comprise: an outermost security zone providing unsecured data exchange, a first security zone in which application workers validate sender credentials and message format, a second security zone that receives data validated in the first zone, the validated data being archived or sent to the mobile communications device, a third security zone that receives data from the second security zone to be sent to the mobile communications device, such data being encrypted in the third security zone, and a fourth security zone that receives data from the second security zone that is to be archived and data from the third security zone to decrypt, the fourth security zone providing a highest level of security as compared to the other security zones.

2. A method as in claim 1, further comprising: automatically deleting the message on the mobile communications device immediately upon the recipient finishing viewing the message.

3. A method as in claim 2, wherein automatically deleting comprises: repeatedly overwriting the message and deleting the corresponding overwrites.

4. A method as in claim 1, wherein the second mobile communications device encrypts the message using a key for the recipient.

5. A method as in claim 4, wherein the key is stored on the second mobile communications device.

6. A method as in claim 1, wherein the remote server encrypts the message using a key for the recipient.

7. A method as in claim 1, wherein the message is retrieved using a secure transmission protocol.

8. A method as in claim 7, wherein the secure transmission protocol comprises Secure Sockets Layer protocol.

9. A method as in claim 1, wherein the plurality of security zones are configured to comply with one or more of HIPAA and PCI-DSS Level 1 protocols.

10. A method as in claim 1, wherein data within the fourth security zone that is to be archived is encrypted with a second encryption key so that the data is doubly encrypted.

11. A method as in claim 1, wherein the generation, encryption, and decryption of the message is generated using a software module based on a software development kit, the software development kit interfacing with an application to enable secure message exchange.

12. An article of manufacture comprising: computer executable instructions stored on non-transitory computer readable media, which, when executed by at least one data processor, causes the at least one data processor to perform operations comprising: generating a message for delivery to a mobile communications device; encrypting the message and storing the message on a remote server by passing the message through a plurality of security zones that facilitate the performance of separate duties; providing a notification to the mobile communications device via an unsecure notification modality, the notification indicating the availability of the encrypted message on the remote server and comprising a file location identifier; receiving user-generated input on the mobile communications device from a recipient selecting the file location identifier; retrieving, by the mobile communications device, the encrypted message using the file location identifier from the remote server; and decrypting and rendering the message on the mobile communications device; wherein the message is generated on a second mobile communications device by a sender, the second mobile communications device automatically deleting the message after it has been passed through the plurality of security zones stored on the remote server;
wherein the security zones comprise: an outermost security zone providing unsecured data exchange, a first security zone in which application workers validate sender credentials and message format, a second security zone that receives data validated in the first zone, the validated data being archived or sent to the mobile communications device, a third security zone that receives data from the second security zone to be sent to the mobile communications device, such data being encrypted in the third security zone, and a fourth security zone that receives data from the second security zone that is to be archived and data from the third security zone to decrypt, the fourth security zone providing a highest level of security as compared to the other security zones.

13. An article as in claim 12, wherein the operations further comprise: automatically deleting the message on the mobile communications device immediately upon the recipient finishing viewing the message, the automatically deleting comprising repeatedly overwriting the message and deleting the corresponding overwrites.

14. An article as in claim 12, wherein the second mobile communications device encrypts the message using a key for the recipient, the key being stored on the second mobile communications device.

15. An article as in claim 14, wherein the remote server encrypts the message using a key for the recipient, the message being retrieved using a Secure Sockets Layer protocol.

16. An article as in claim 12, wherein the plurality of security zones are configured to comply with one or more of HIPAA and PCI-DSS Level 1 protocols.

17. A system comprising: at least one data processor; memory storing instructions which, when executed by the at least one data processor, causes the at least one data processor to perform operations comprising: generating a message for delivery to a mobile communications device; encrypting the message and storing the message on a remote server; providing a notification to the mobile communications device via an unsecure notification modality, the notification indicating the availability of the encrypted message on the remote server and comprising a file location identifier; receiving user-generated input on the mobile communications device from a recipient selecting the file location identifier; retrieving, by the mobile communications device, the encrypted message using the file location identifier from the remote server; and decrypting and rendering the message on the mobile communications device; wherein the message is generated on a second mobile communications device by a sender, the second mobile communications device automatically deleting the message after it has been passed through the plurality of security zones stored on the remote server; wherein data used to generate and retrieve the message passes through each of a plurality of security zones that facilitate the performance of separate duties comprising: an outermost security zone providing unsecured data exchange, a first security zone in which application workers validate sender credentials and message format, a second security zone that receives data validated in the first zone, the validated data being archived or sent to the mobile communications device, a third security zone that receives data from the second security zone to be sent to the mobile communications device, such data being encrypted in the third security zone, and a fourth security zone that receives data from the second security zone that is to be archived and data from the third security zone to decrypt, the fourth security zone providing a highest level of security as compared to the other security zones.

* * * * *

UNITED STATES PATENT AND TRADEMARK OFFICE
CERTIFICATE OF CORRECTION

| | | |
|---|---|---|
| PATENT NO. | : 9,225,694 B1 | Page 1 of 1 |
| APPLICATION NO. | : 13/399792 | |
| DATED | : December 29, 2015 | |
| INVENTOR(S) | : Jared Reitzin et al. | |

It is certified that error appears in the above-identified patent and that said Letters Patent is hereby corrected as shown below:

On the title page, (75) Inventors: delete "Reitzen" and insert -- Reitzin --, therefor.

Signed and Sealed this
Nineteenth Day of April, 2016

Michelle K. Lee
*Director of the United States Patent and Trademark Office*